No. 771,629.

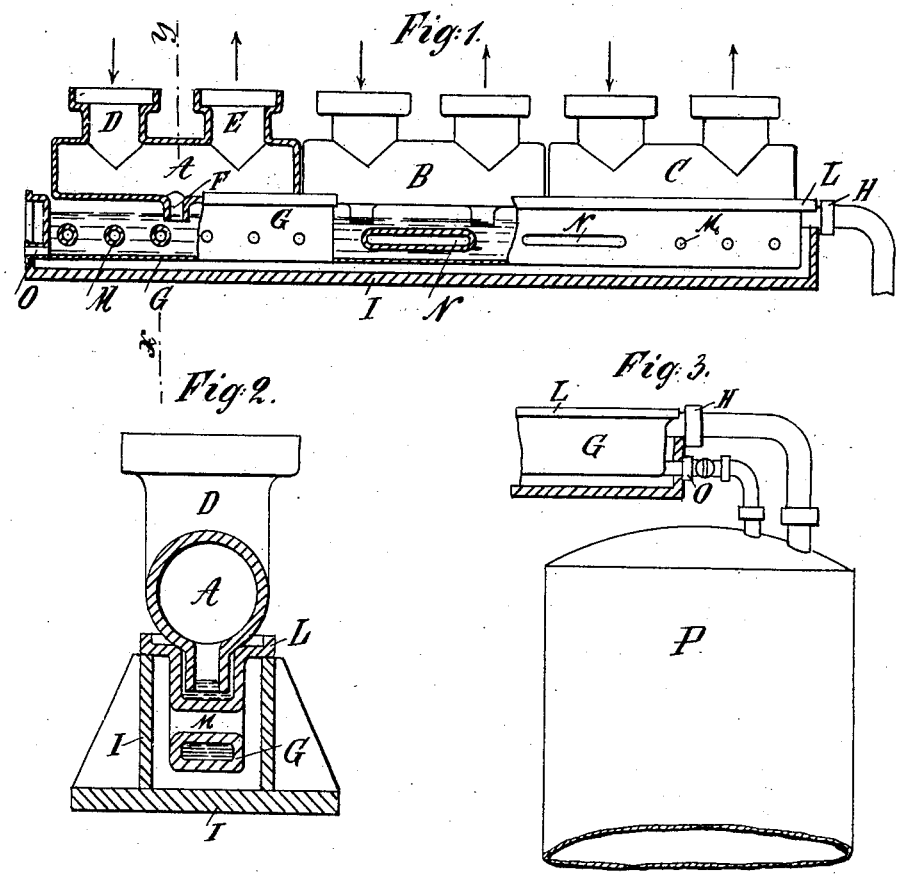

Patented October 4, 1904.

UNITED STATES PATENT OFFICE.

OSCAR GUTTMANN, OF LONDON, ENGLAND.

APPARATUS FOR CONDENSING NITRIC ACID.

SPECIFICATION forming part of Letters Patent No. 771,629, dated October 4, 1904.

Application filed December 26, 1901. Serial No. 87,351. (No model.)

*To all whom it may concern:*

Be it known that I, OSCAR GUTTMANN, a subject of the King of Great Britain and Ireland, residing at 12 Mark Lane, in the city of London, England, have invented a new and useful Apparatus for Condensing Nitric Acid, of which the following is a specification.

My invention relates to an apparatus for condensing nitric acid, and has for its object the condensation of nitric acid from the gaseous into the liquid state in such manner that a liquid nitric acid is obtained comparatively free from impurities. The apparatus as hereinafter described is of simple construction and at the same time more efficient and durable than the condensing apparatus heretofore employed for such purpose.

My invention consists in the combination of the usual condensing pipes or vessels with connecting units each provided with an inlet and an outlet for the gases and an exit at the bottom for the condensed liquid and also with a common receiving-channel, the said connecting units forming a cover for the receiving-channel.

It is well known that in order to obtain liquid nitric acid comparatively free from impurities it is necessary to remove the condensed liquid nitric acid as rapidly as possible from contact with the uncondensed nitrous vapors and other gases which arise during distillation, since otherwise the vapors and gases by prolonged contact with the condensed liquid acid become absorbed or dissolved therein, thus resulting in the production of a liquid nitric acid containing nitrous acid and other undesirable impurities. It is also well known that in the manufacture of nitric acid it is advantageous to condense the acid from the gaseous to the liquid state at as high a temperature as possible, so as to avoid as far as possible the presence of such undesirable nitrous acid and other impurities in the condensed acid, because such nitrous acid and other impurities are less soluble and less absorbent in the liquid acid at a higher temperature of condensation than at a lower one. If, moreover, a water-white liquid nitric acid is required, it is advisable to condense the liquid acid at as high a temperature as possible, so that when air is afterward blown through the warm liquid acid the undesirable nitrous acid and other impurities which produce discoloration may be the more readily and rapidly removed.

The condensing apparatus usually employed in the manufacture of nitric acid consists of a number of condensing vessels or pipes, and for the purpose of quickly removing the condensed acid out of contact with the uncondensed gases these vessels or pipes are sometimes connected to so-called "chamber-pipes" of stoneware or like material. Such chamber-pipes are pipes divided into a number of small compartments by partitions rigidly built in them at right angles, and these chambers are connected to each other by U-tubes. These chamber-pipes are difficult to make. They must of necessity be of considerable length and must be rigidly connected to the condensing vessels or pipes in order to form the complete condensing apparatus. Both on account of these partitions and U-tubes, as also of the rigid connections, the chamber-pipes are subjected to unequal expansion and contraction under the combined influence of the hot condensed acid and the uncondensed acid vapors in their interior and of the colder exterior air. This irregular expansion and contraction frequently causes fracture of the chamber-pipes, resulting in great inconvenience and breakdown of the work and also loss of condensed acid, besides the expense for replacing the broken chamber-pipes. It is also obvious that if a higher temperature of condensation is employed the interruption in working, loss of acid, and expenses involved will be more frequent in consequence of the greater expansion and contraction through the greater difference between the higher temperature in the interior of the chamber-pipe and the temperature of the external air.

My improved condensing apparatus is of such construction that the condensed acid is immediately removed from contact with the uncondensed products, the temperature of condensation being at the same time so regulated and the whole operation so conducted that fracture or cracking of the component parts of the apparatus from the causes above mentioned is avoided.

The annexed drawings illustrate the manner in which my invention can be carried into effect, like letters referring to like parts throughout the various figures.

Figure 1 is a longitudinal section of my improved condensing apparatus, certain parts being shown in elevation. Fig. 2 is a cross-section taken on the line $x\,y$ of Fig. 1. Fig. 3 is an elevation, partly in section, of a portion of the end of the apparatus, showing the connection of the collecting vessel for the condensed acid with overflow and outlet pipe of the receiving-channel of the condensing apparatus. Figs. 4 and 5 are cross-sections of modified forms of the apparatus.

My improved condensing apparatus consists of a number of condensing vessels or pipes of ordinary form, which being well known are not shown in the drawings, each two of which are jointed to a connecting unit A B C. The units for this purpose have at the top inlet and outlet socket-pipes D and E for the passage of the acid gases or vapors to be condensed, and at the bottom a short exit-pipe F for the discharge of liquid nitric acid condensed in the said vessels or pipes. These connecting units may be of any suitable cross-section—for example, of cylindrical section, as in Fig. 2. The connection between the condensing vessel or pipe at the outlet of any connecting unit and the condensing vessel or pipe at the inlet of another connecting unit is effected by pipe bends in the usual manner.

The above-described connecting units A B C rest on the top flanges of the trough-shaped receiving-channel G, into which runs the acid condensed in the condensing vessels or pipes, and they form a cover for the said receiving-channel. The latter has an overflow socket-pipe H, provided at any suitable place, but at such height relatively to the lower ends of the exit-pipes F of the connecting units that the condensed acid while continuously flowing into and out of the receiving-channel collects at a higher level in this channel than the bottom of the said exit-pipes F, so as to form a liquid seal to prevent the uncondensed gases or vapors passing through the condensing apparatus from coming into further contact with the condensed acid contained in the receiving-channel. The connecting units A B C, resting on the top flanges L of the receiving-channel G, form a tightly-fitting cover therefor, asbestos, cement, or the like being applied between the body of the connecting unit A and the turned-up edge of the flanges L. The receiving-channel G is also provided with an outlet O, which may be placed at either end, as shown in Figs. 1 and 3, so that the acid contained in the said receiving-channel can at any desired time be run off into the collecting vessel P.

For the purpose of cooling or otherwise regulating the temperature of the acid flowing through the receiving-channel G, as below described, pipes of cylindrical or other form, such as M and N, may be arranged to run transversely through the receiving-channel, admitting of free passage of air when no attemperating vessel I is employed or when such is used as hereinafter described, admitting water or other attemperating liquid, steam, or other warm gas to circulate freely.

In order to regulate the temperature in the interior of the receiving-channel G, I sometimes employ an attemperating vessel I of such form that there is room inside for the receiving-channel, its flanges resting on the top of the said attemperating vessel I. I provide this attemperating vessel at suitable places with inlet and outlet openings for the introduction of an appropriate attemperating liquid or of steam, warm air, or other gas. In this manner I can control and regulate the temperature of the said flowing through the receiving-channel G, and in this way the manufacture of water-white acid is for the above-mentioned reasons greatly facilitated.

In the modified construction of the apparatus shown in Fig. 4 the connecting vessel is of D-section. In Fig. 5 the connecting vessel is shown as having flanges.

It is obvious that the form, size, and arrangement of the various parts of this condensing apparatus may be modified without departure from the essential features of the invention; also, that my improved condensing apparatus may be readily adapted for the condensation of products other than nitric acid.

I claim—

In an acid-condenser, a connecting unit consisting of a chamber, inlet and outlet socket unions thereon and a comparatively small depending outlet for condensed acid adapted to be liquid-sealed by the condensed acid, substantially as described.

In testimony that I claim the foregoing as my invention I have signed my name in presence of two subscribing witnesses.

OSCAR GUTTMANN.

Witnesses:
  H. D. JAMESON,
  H. A. GREENGRASS.